United States Patent
Marshall

(10) Patent No.: US 11,306,513 B1
(45) Date of Patent: Apr. 19, 2022

(54) LOCKOUT PREVENTION SYSTEM FOR ELECTRICAL DISCONNECTS/SAFETY SWITCHES

(71) Applicant: Chad Marshall, Lakeland, FL (US)

(72) Inventor: Chad Marshall, Lakeland, FL (US)

(*) Notice: Subject to any disclaimer, the term of this patent is extended or adjusted under 35 U.S.C. 154(b) by 428 days.

(21) Appl. No.: 16/575,188

(22) Filed: Sep. 18, 2019

Related U.S. Application Data

(60) Provisional application No. 62/814,524, filed on Mar. 6, 2019.

(51) Int. Cl.
*E05B 67/38* (2006.01)
*F16P 3/00* (2006.01)

(52) U.S. Cl.
CPC .............. *E05B 67/383* (2013.01); *F16P 3/00* (2013.01)

(58) Field of Classification Search
CPC ........ E05B 67/383; E05B 13/002; F16P 3/00; F16P 3/08
USPC .......... 70/202, 203, 211, 212, 200, DIG. 30, 70/DIG. 58; 200/43.11–43.16, 43.19, 200/43.21, 43.22, 43.01
See application file for complete search history.

(56) References Cited

U.S. PATENT DOCUMENTS

| | | | | |
|---|---|---|---|---|
| 3,312,794 A | * | 4/1967 | Hollyday | H01H 9/282 200/43.15 |
| 4,347,412 A | * | 8/1982 | Mihara | H01H 9/283 200/43.15 |
| 4,978,816 A | * | 12/1990 | Castonguay | H01H 9/282 200/43.14 |
| 5,449,867 A | * | 9/1995 | Kelaita, Jr. | H01H 9/281 200/43.14 |
| 5,467,622 A | * | 11/1995 | Becker | E05B 13/002 70/203 |
| 5,468,925 A | * | 11/1995 | Mohsen | H01H 9/283 200/43.11 |
| 6,015,956 A | * | 1/2000 | Green | H01H 9/283 200/43.14 |
| 2008/0073187 A1 | * | 3/2008 | Rezac | H01H 9/223 200/43.14 |
| 2008/0277250 A1 | * | 11/2008 | DeCook | H01H 71/1054 200/43.14 |

* cited by examiner

*Primary Examiner* — Lloyd A Gall
(74) *Attorney, Agent, or Firm* — John Rizvi; John Rizvi. P.A.—The Patent Professor

(57) ABSTRACT

A lockout prevention system for safety switches. The system may be universal, in that it may be installed on various different brands and styles of industrial safety switch gear boxes. The system blocks a locking aperture when a lever arm is in a "non-off position" (e.g. displaced away from the "off" position). This prevents users from accidentally locking a padlock in the locking aperture while the switch is in an "on position". The system still allows a user to lock the lever arm in the "off position". The device may be universally mounted to switch boxes using two or more bolts. Further, the system is height-adjustable.

20 Claims, 16 Drawing Sheets

LOCKOUT PREVENTION SYSTEM FOR ELECTRICAL DISCONNECTS/SAFETY SWITCHES

CROSS-REFERENCE TO RELATED APPLICATIONS

This application claims priority to U.S. Provisional Patent Application 62/814,524 filed Mar. 6 2019, which is incorporated herein in its entirety.

FIELD OF THE INVENTION

The present invention relates generally to lockout prevention systems and more particularly a lockout prevention system for safety switches.

BACKGROUND OF THE INVENTION

It is common for various industrial or commercial switches, machines, equipment, devices, and/or appliances that are electrically charged, energized, or run, to require a lockout-tagout system or procedure which are sometimes referred to as LOTO or lock and tag system or procedure. These systems provide safety in industry and research settings to ensure that dangerous machines are properly disabled or shut off, rendering the machines locked out of being started up again. For example, it is common for machines to require locking out for maintenance or repair work to be done.

Safety switches are common devices in commercial and industrial settings that allow a user to turn off a circuit via a lever or handle or other manual operation component. They are usually configured to quickly make and break operation of various connected devices. A large handle is usually rotated downward to adapt such a safety switch into an "off" position, and rotated upward to an "on" position.

Such safety switches are commonly equipped with a configuration that allows users to lock the safety switches in an "off" position. For example, a handle may have an aperture, and a frame of the switch may have an aperture, such that the aperture in the handle and the aperture in the frame align to receive a lock, such as a padlock or a lockout-tagout device, therethrough. As another example, a handle may not have an aperture but it may be configured to rotate past the aperture of the switch frame to be able to lock the handle from moving across the aperture of the switch frame.

However, there is a serious problem that such current methods and systems have. A worker may accidentally lock a device such as a safety switch in the "on" position and in case of an emergency a worker may not be able to turn the device off. Deaths have been reported due to this problem. For example, a worker may believe the device is locked off when it is actually locked in an "on" position with the locking device being locked through one of the lockout holes described above.

Therefore, there exists a need for a universal system that may augment such safety switches or other switch devices to prevent such devices from being locked in the wrong position.

SUMMARY OF THE INVENTION

This summary is provided to introduce a selection of concepts in a simplified form that are further described below in the detailed description. This summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

The disclosed device is a non-off lockout prevention system for electrical disconnects, safety switches or other switch devices. The system may be universal, in that it may be installed on various different brands and styles of industrial safety switch gear boxes. The system blocks a locking aperture when a lever arm is in a "non-off position" (e.g. displaced away from the "off" position). This prevents users from accidentally locking a padlock or other lockout device (e.g. lockout-tagout device) in the locking aperture while the switch is in an "on position" or generally a "non-off position". The device may also be referred to as a non-off disconnect guard.

In another aspect, the system still allows a user to lock the lever arm in the "off position".

In another aspect, the device may be universally mounted to switch boxes using two or more bolts.

In another aspect, the system is height-adjustable.

In another aspect, the system may include two moving panels and one fixed panel.

In another aspect, a first panel is disposed closest to a side of a safety switch.

In another aspect, a second panel is disposed in between the first panel and a third panel.

In another aspect, the first panel is configured to attach the system to the switch box or housing via one or more fasteners such as screws, nuts, and/or bolts.

In another aspect, the third panel is configured to rotate directly with respect to operation of the handle.

In another aspect, the second panel is configured to start rotating after the third panel, and the handle reach a certain angle of rotation.

In another aspect, the second panel includes an aperture that aligns with an aperture of the switch, such that the handle may be locked in an "off" position.

In another aspect, while the switch is unlocked (e.g. without presence of a padlock), once the handle is operated upward, the third panel rotates to a certain degree, then the second panel starts rotating after that certain degree, which subsequently causes the second and/or the third panel to block the locking aperture of the switch, and/or causes the aperture of the second or third panel to rotate away from the locking aperture of the switch.

In another aspect, in the "on" position the second and/or third panel blocks the locking aperture of the switch that normally would be exposed in the "on" position.

In another aspect, the system blocks and prevents the locking aperture of the switch from receiving a lockout-tagout device or padlock while the handle is in the "on position".

In another aspect, in other words, the system prevents or blocks the locking aperture of the switch from being locked via a lockout-tagout device or padlock while the lever or handle is in an "on" position, or more generally while the lever or handle is in a "non-off" position.

In another aspect, the disclosed system prevents the usage of an OEM locking aperture of a safety switch box while the safety switch box is in a "non-off" position.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
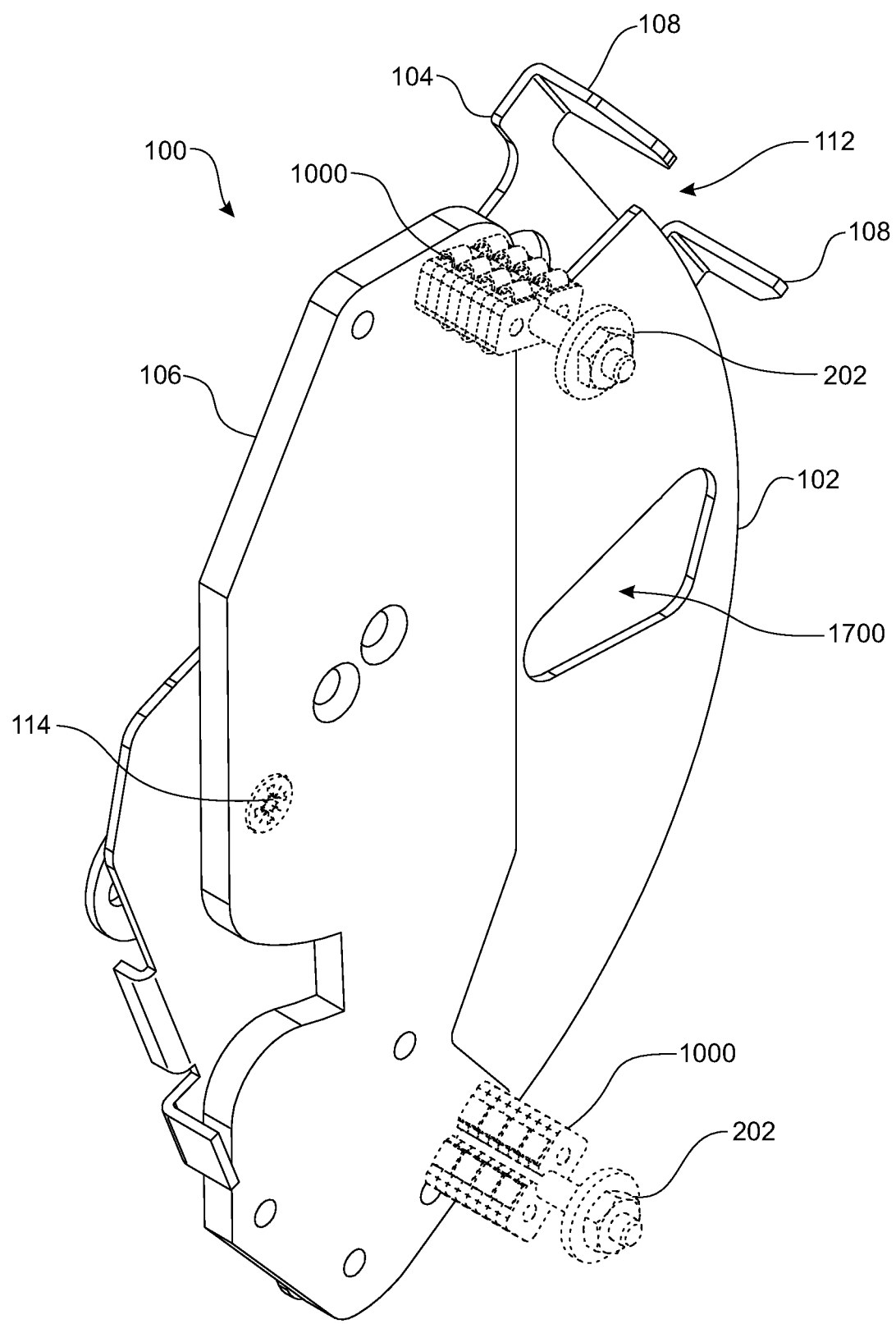
FIG. 2 presents a rear perspective view thereof, in accordance with aspects of the present disclosure.
Figure 3:
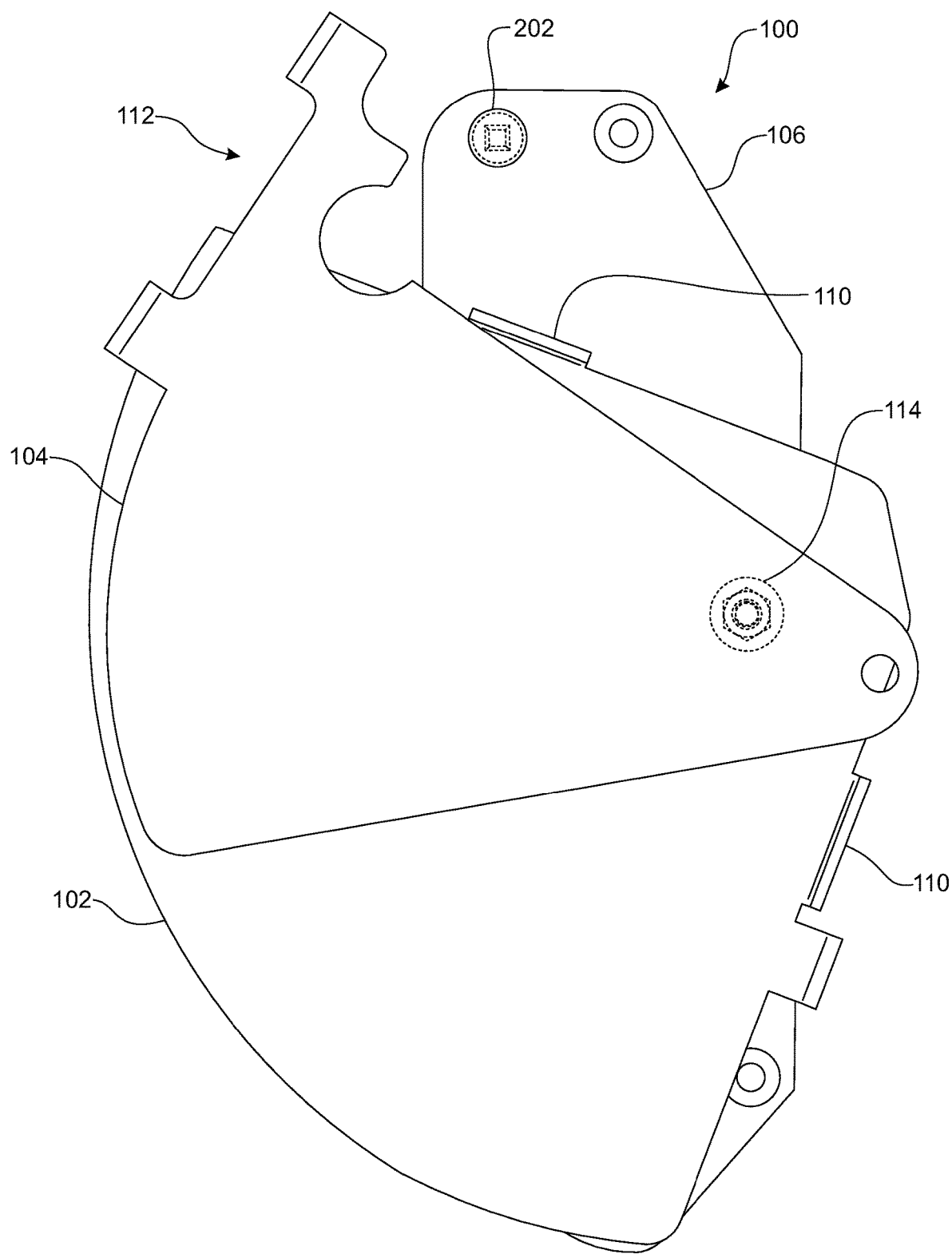
FIG. 3 presents a front view thereof, in accordance with aspects of the present disclosure.
Figure 4:
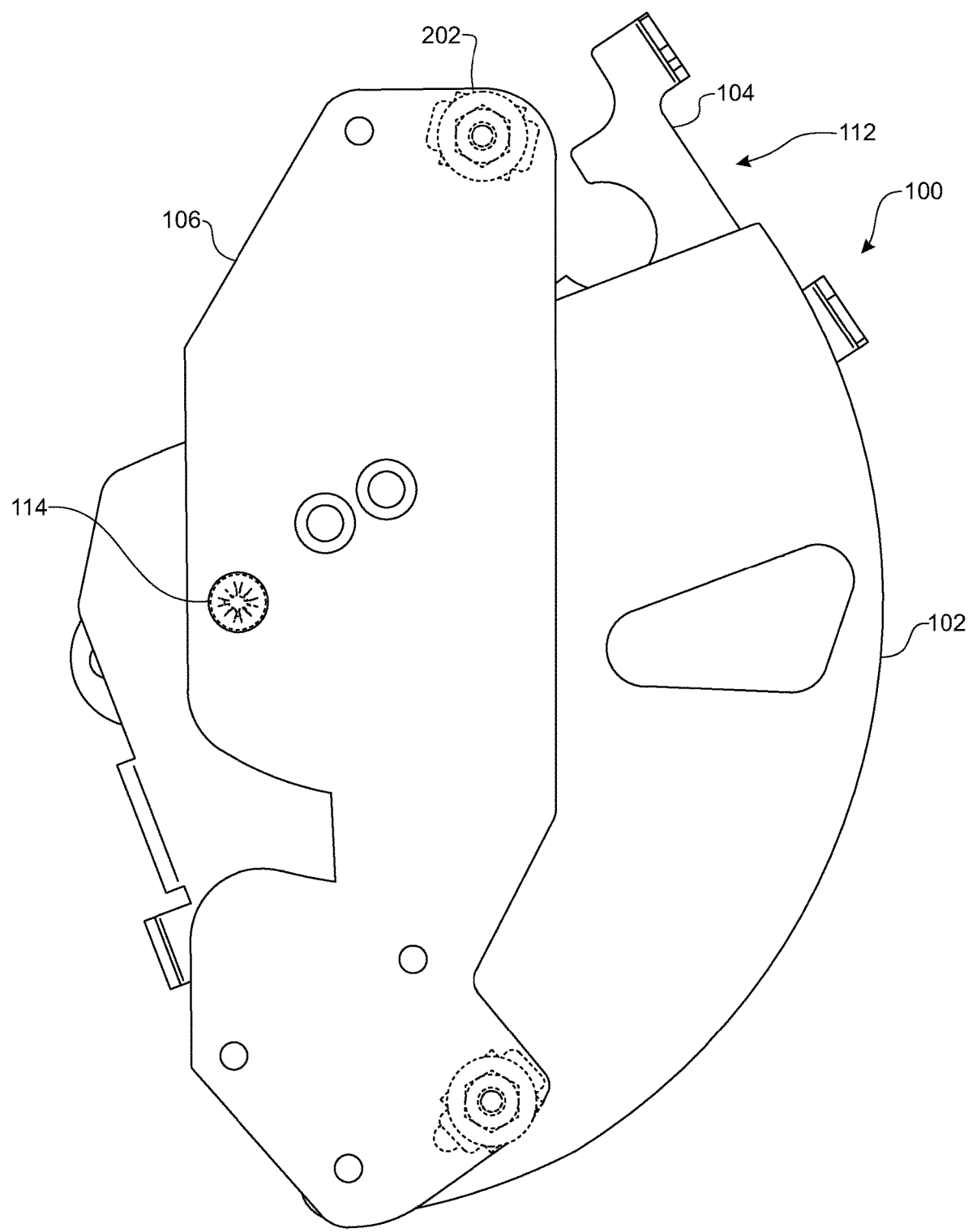
FIG. 4 presents a rear view thereof, in accordance with aspects of the present disclosure.
Figure 5:
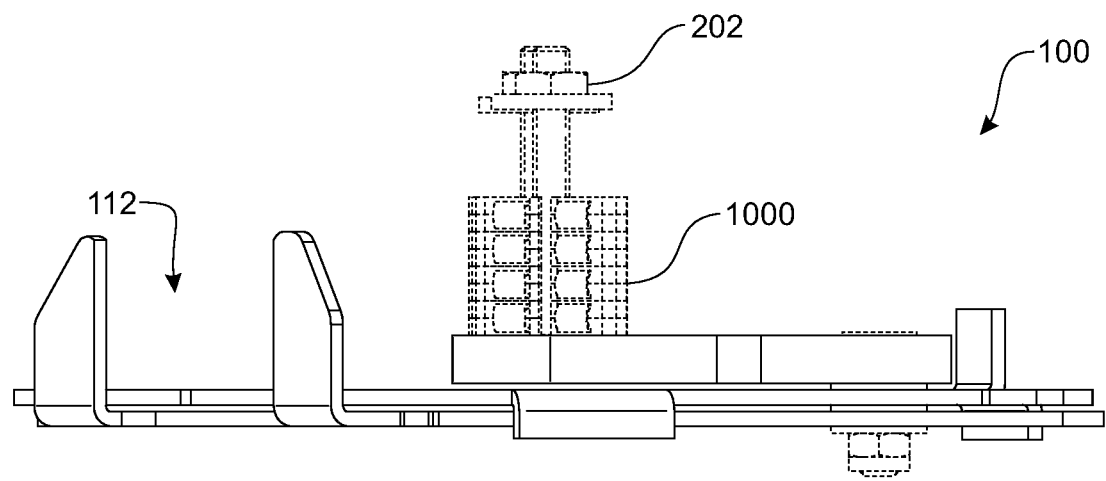
FIG. 5 presents a top view of the lockout prevention system, in accordance with aspects of the present disclosure.
Figure 6:
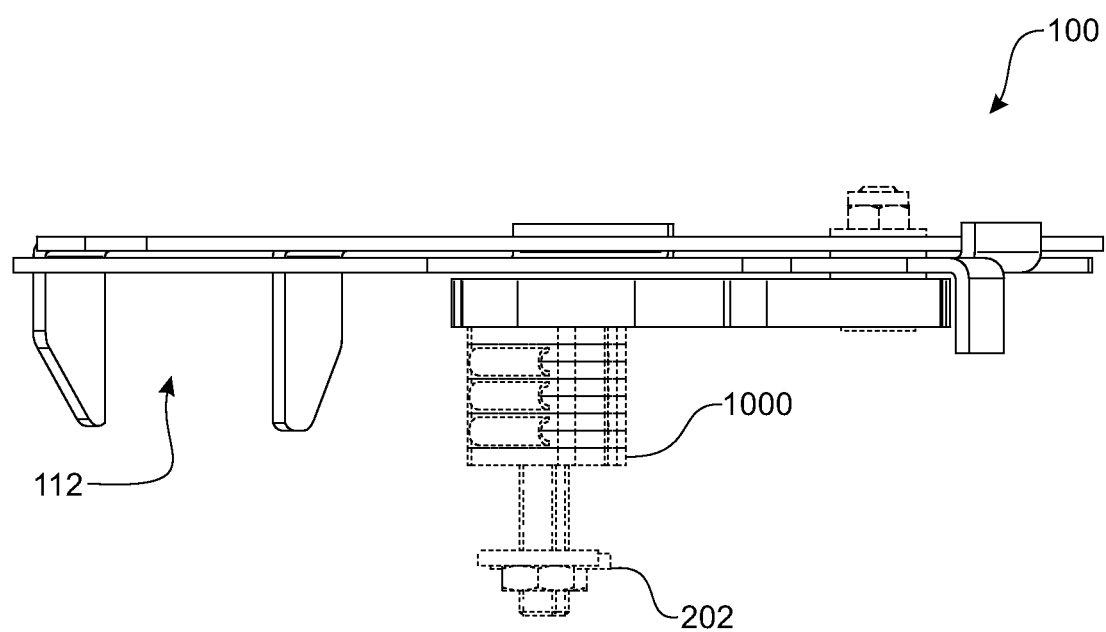
FIG. 6 presents a bottom view of the lockout prevention system, in accordance with aspects of the present disclosure.
Figure 7:
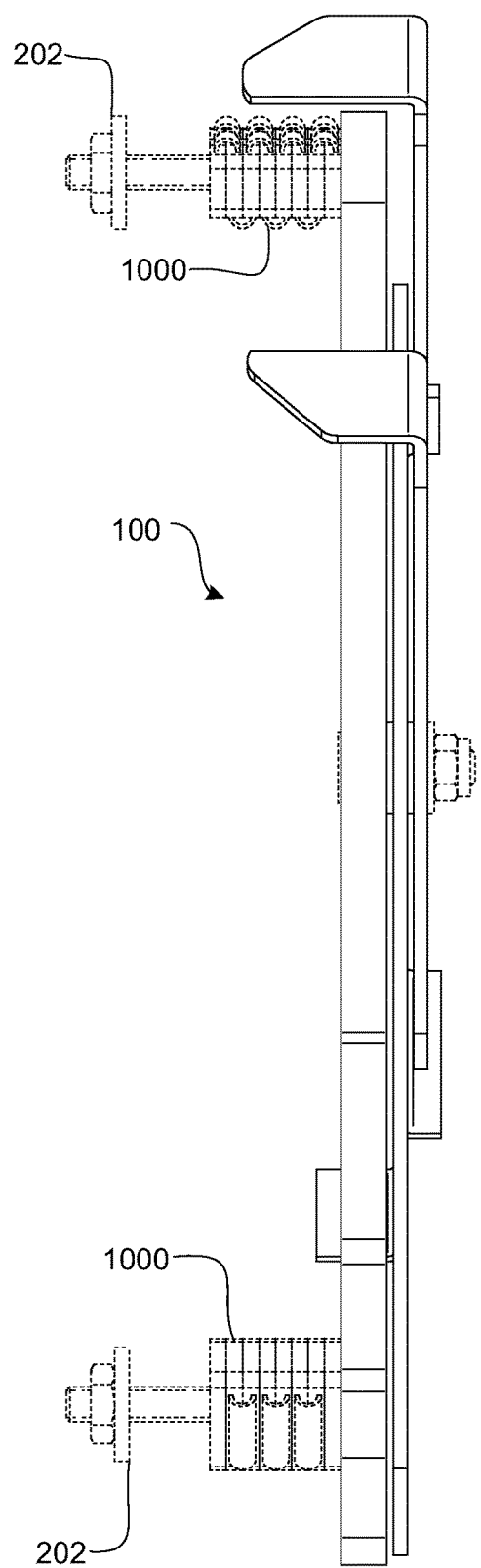
FIG. 7 presents a side elevation view of the lockout prevention system, in accordance with aspects of the present disclosure.
Figure 8:
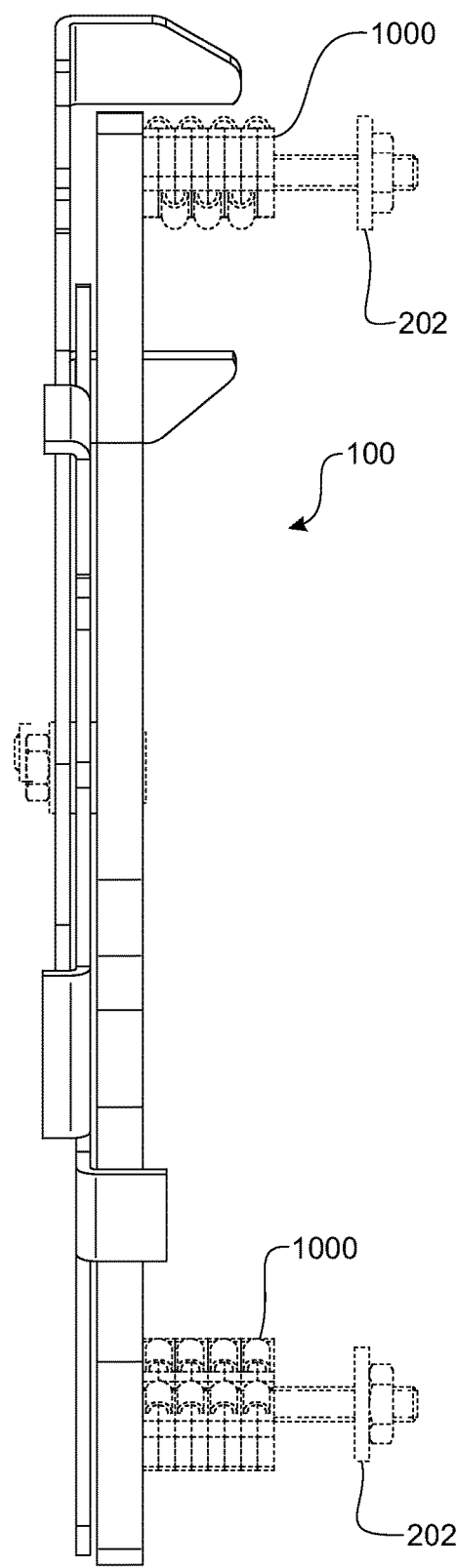
FIG. 8 presents a side elevation view of an opposite side thereof, in accordance with aspects of the present disclosure.
Figure 9:
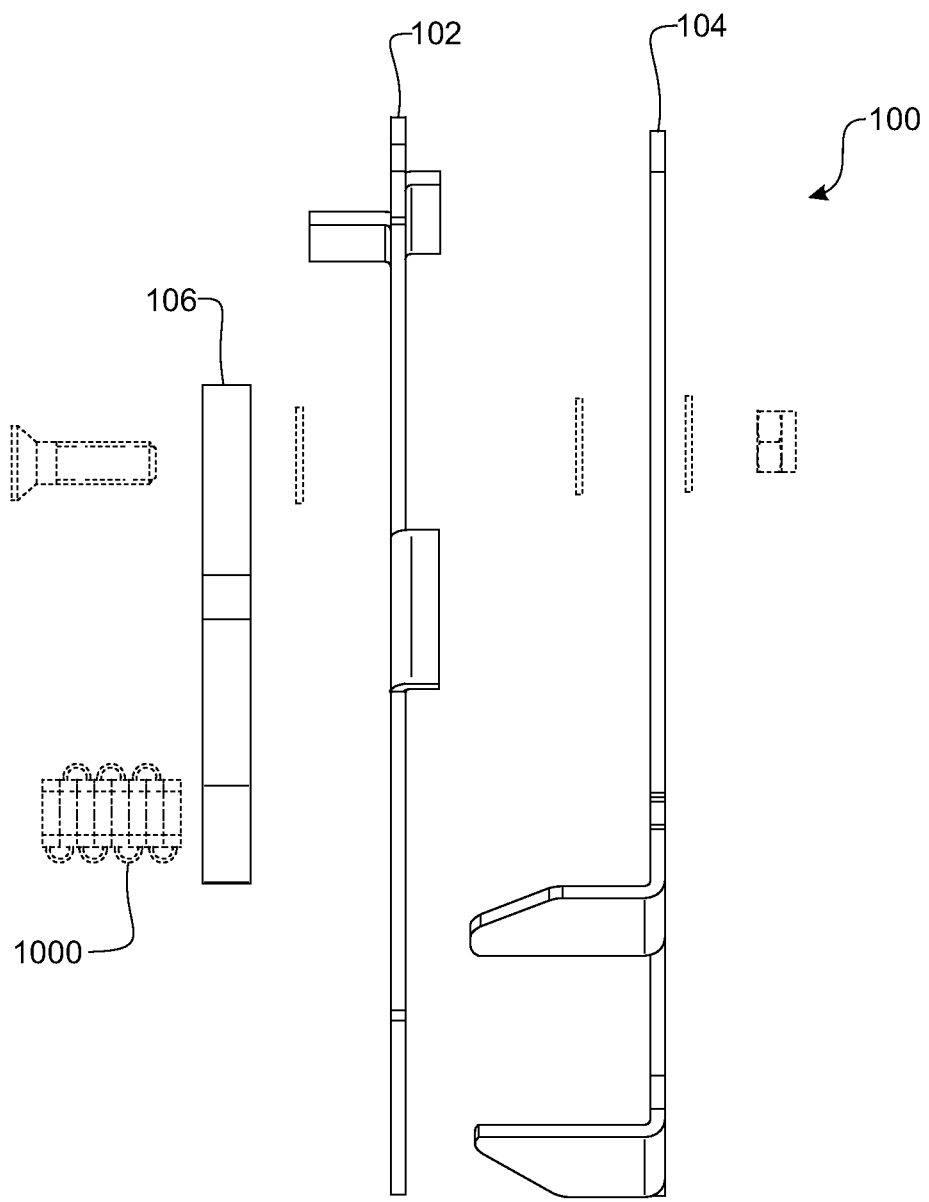
FIG. 9 presents a top exploded view of the lockout prevention system, in accordance with aspects of the present disclosure.
Figure 10:
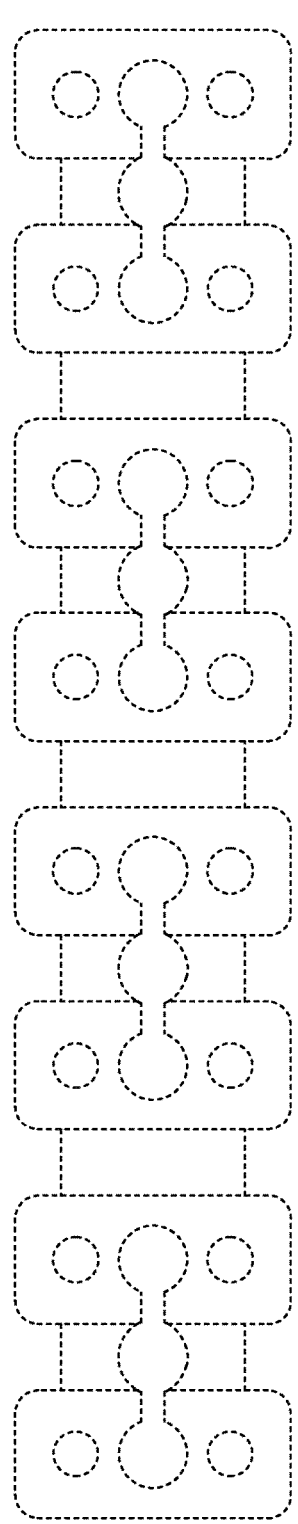
FIGS. 10-10C show examples of a spacer configured to create a space for a panel of the lockout prevention system in which the techniques described may be practiced according to certain embodiments.
Figure 11:
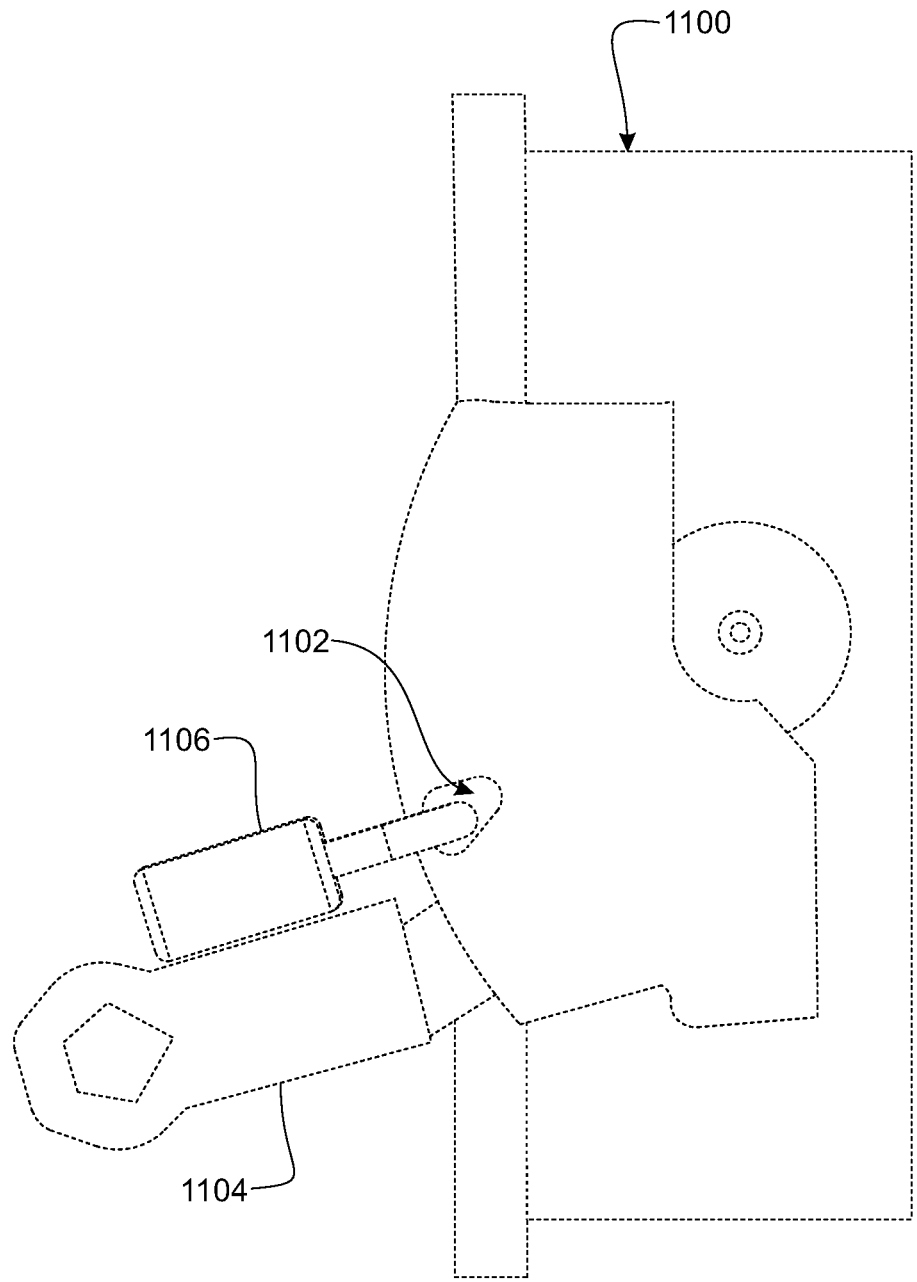
FIG. 11 presents a front view of a safety switch in the "off" position, where a padlock is locking the safety switch in the "off" position, the disclosed system not shown.

Shown throughout the figures is a lockout prevention system 100 for safety switches 1100 or other switch devices. The system 100 may be universal, in that it may be installed on various different brands and styles of industrial safety switch gear boxes 1100 (FIG. 11). The system 100 blocks (FIG. 13) a locking aperture 1102 (FIGS. 11-12) when a lever arm 1104 is in a "non-off position" (FIG. 13) (e.g. displaced away from the "off" position, or to an "on" position). The disclosed configuration prevents users from accidentally locking a padlock 1106 (FIG. 12) or other lockout device (e.g. lockout-tagout device) in the locking aperture 1102 while the switch 1100 or lever arm 1104 is in an "on position" or generally a "non-off position". The system still allows a user to lock the lever arm 1104 in the "off position". The system 100 may be universally mounted to switch boxes 1100 using two or more bolts 202 (FIG. 2). Further, the system 100 is height-adjustable. For example, the system 100 may be height-adjustable via spacers 1000 (FIG. 10 and FIG. 9). The spacers 1000 are configured to receive fasteners 202 as shown in FIG. 5.

More particularly, the system 100 may include two moving panels (first moving panel 102 and second moving panel 104) and one fixed panel 106. The fixed panel 106 is disposed closest to a side of a safety switch 1100. The first moving panel 102 is disposed in between the fixed panel 106 and the second moving panel 104.

Figure 1:
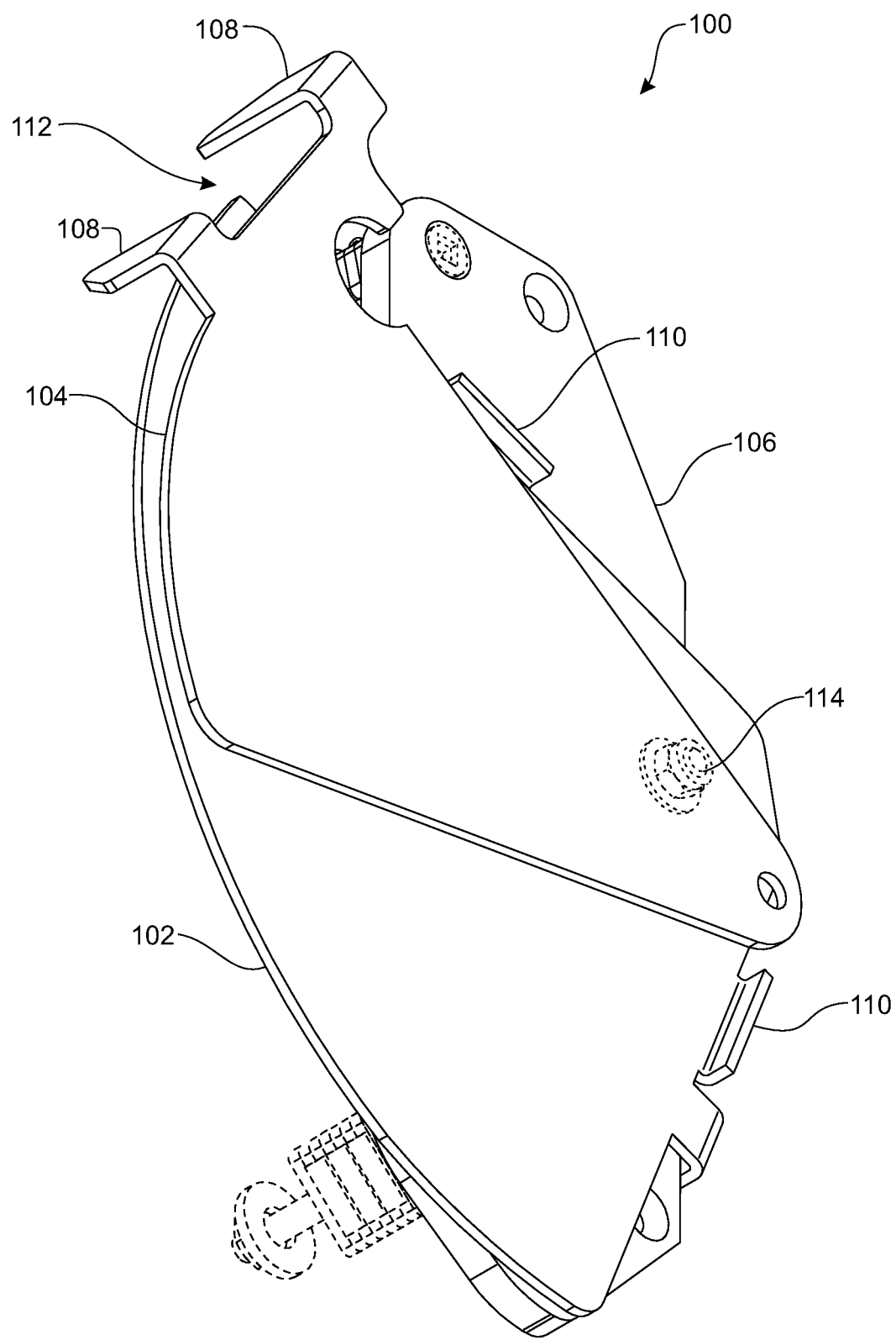
FIG. 1 presents a front perspective view of an example of the lockout prevention system, in accordance with aspects of the present disclosure.
Figure 15:
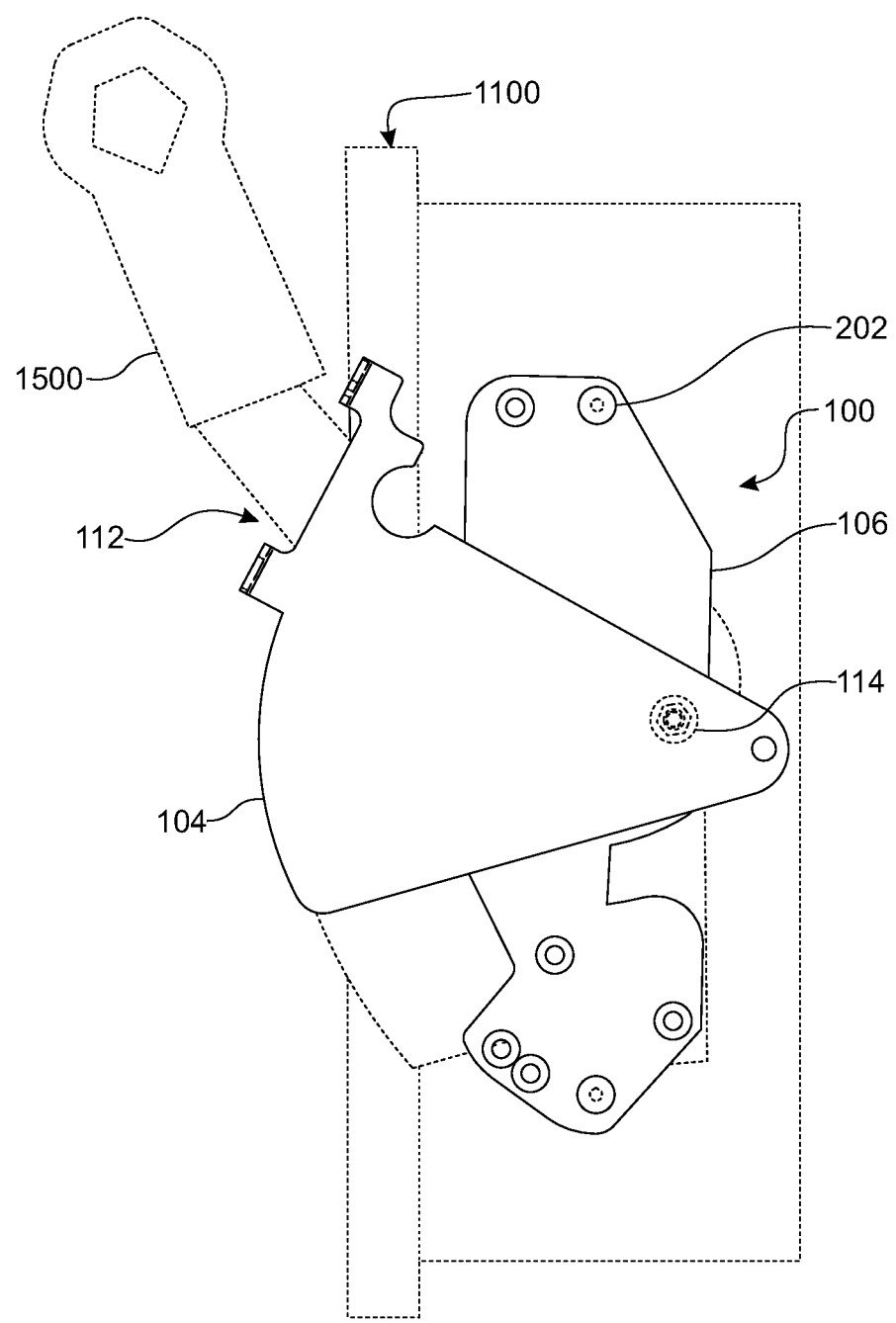
FIG. 15 presents a front view of the lockout prevention system of the present disclosure affixed to the safety switch in the "on" position, where an outer second panel blocks a locking aperture of the safety switch, to prevent the safety switch from being locked in the "on" position, in accordance with aspects of the present disclosure.

The fixed panel 106 is configured to attach the system 100 to the switch box 1100 or housing via one or more fasteners such as screws, nuts, and/or bolts 202. For example, as shown in FIGS. 2 and 5, a fastener 202 is configured to non-rotatably fasten at least the inner fixed panel 106 to a safety gear box. The second moving panel 104 is configured to rotate directly with respect to operation of a handle 1500 (FIG. 15). The first moving panel 102 is configured to start rotating after the second moving panel 104, and the handle 1500 reach a certain angle of rotation. For example, FIG. 1 shows the second moving panel 104 including two perpendicular structures 108 (e.g. perpendicular to a plane of the panel), such that the handle 1500 is located between the two perpendicular structures 108 for directly causing the second moving panel 104 to rotate or pivot when the handle 1500 is rotated. It is to be understood that the perpendicular structures 108 may be included on any moving panel described herein.

Figure 17:
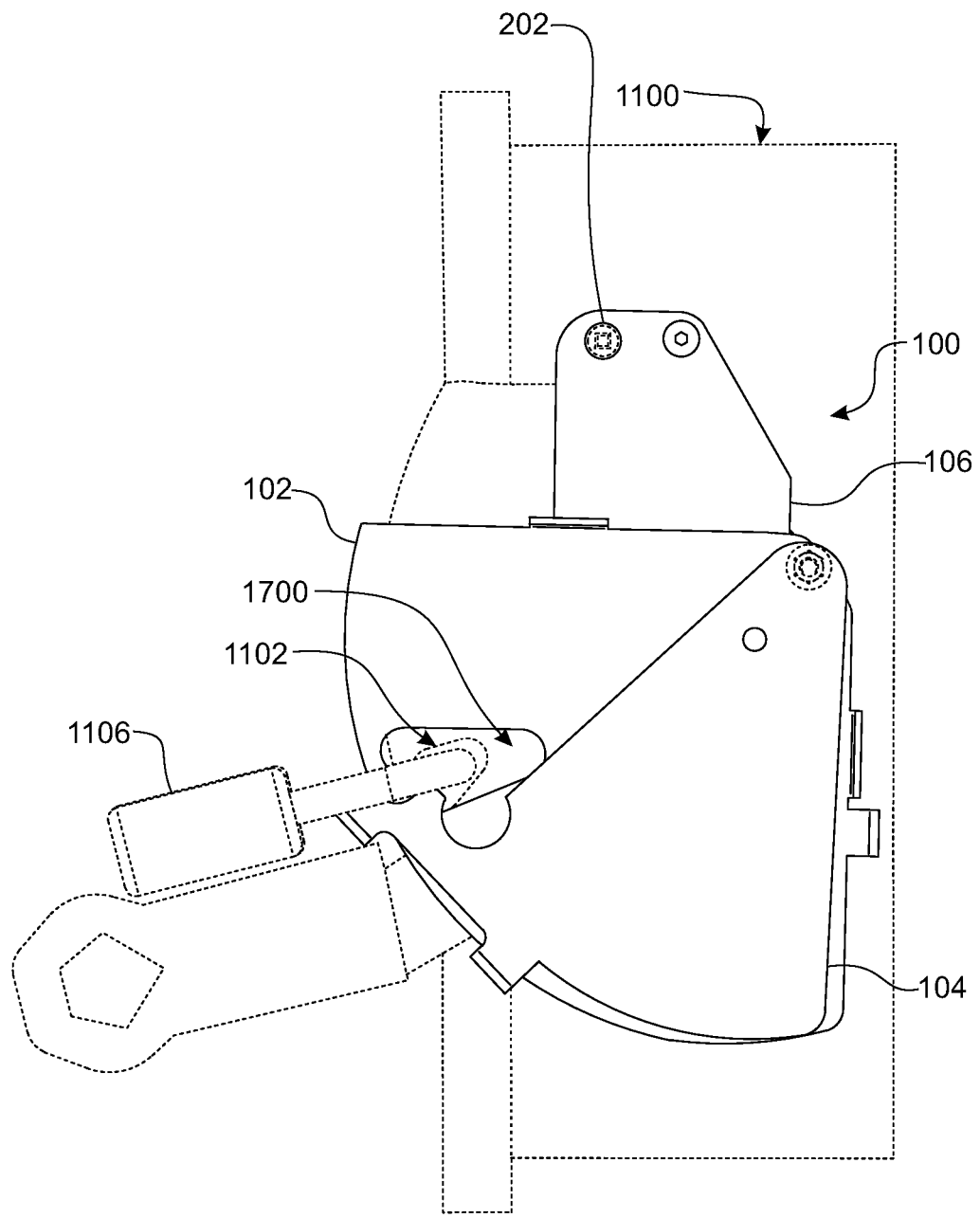
FIG. 17 presents a front view of the lockout prevention system in an "off" position affixed to a safety switch in the "off" position, using the second pivot point shown in FIG. 16, in accordance with aspects of the present disclosure.
Figure 18:
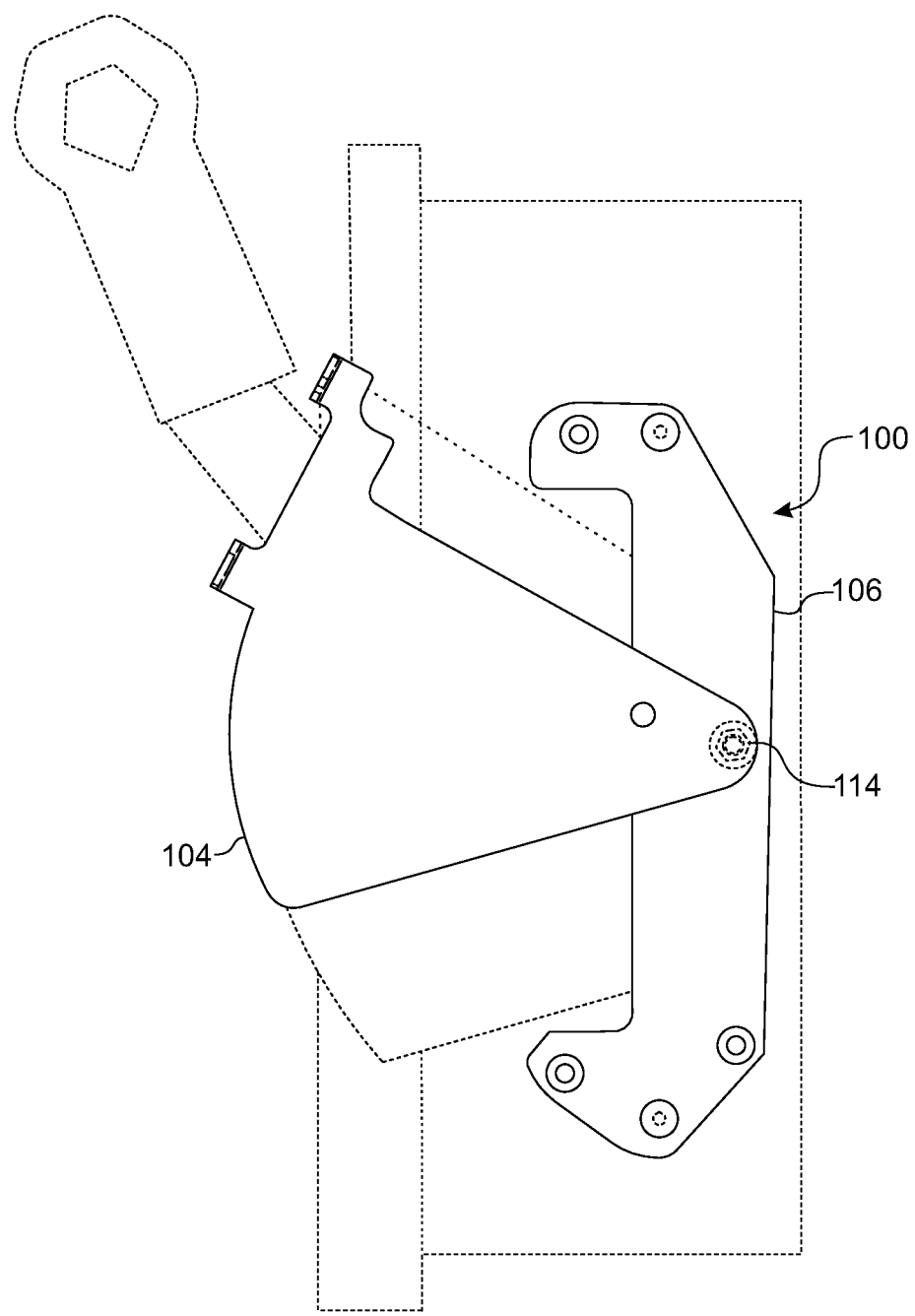
FIG. 18 presents a front view of the lockout prevention system of the present disclosure, in an "on" position affixed to a safety switch in the "on" position to prevent the safety switch from being locked in the "on" position, where a first inner panel has a differently shaped construction for being affixed to the safety switch, in accordance with aspects of the present disclosure.

The first moving panel 102 includes a panel aperture 1700 (FIG. 17) that aligns with a switch aperture 1102, such that the handle 1500 may be locked in an "off" position by locking a padlock 1106 through both the switch aperture 1102 and the panel aperture 1700. For example, to lock the handle 1500 in the "off" position (FIG. 17), the handle 1500 may be locked in a position below the panel aperture 1700 to prevent the handle 1500 from being rotated upward into the "on" position. On the other hand, while the switch 1100 is unlocked (e.g. without presence of a padlock 1106), once the handle 1500 is operated upward, the second moving panel 104 rotates to a certain degree (due to the perpendicular structures 108), then the first moving panel 102 starts rotating after that certain degree, which subsequently causes the first moving panel 102 and/or the second moving panel 104 to block the switch aperture 1102 (i.e. locking aperture of the switch), and/or causes the panel aperture 1700 (e.g. of the first moving panel 102 and/or second moving panel 104) to rotate away from being aligned with the switch aperture 1102. For example, a perpendicular lip 110 (FIG. 1) may be included on an upper area or edge of the first moving panel 102 to cause the second moving panel 104 to apply an upward force to the first moving panel 102 upon reaching a certain degree of rotation. To cause reverse (downward) action of the first moving panel 102, another perpendicular lip 110 (FIG. 1) may be included on the first moving panel 102 on an opposite end of the first moving panel 102 relative to the top perpendicular lip 110, to cause the second moving panel 104 to apply downward rotation of the first moving panel 102 upon reaching a certain downward rotation angle. Therefore, the perpendicular lips are cross a plane of motion of the second moving panel 104 to intercept or contact the second moving panel 104.

Figure 16:
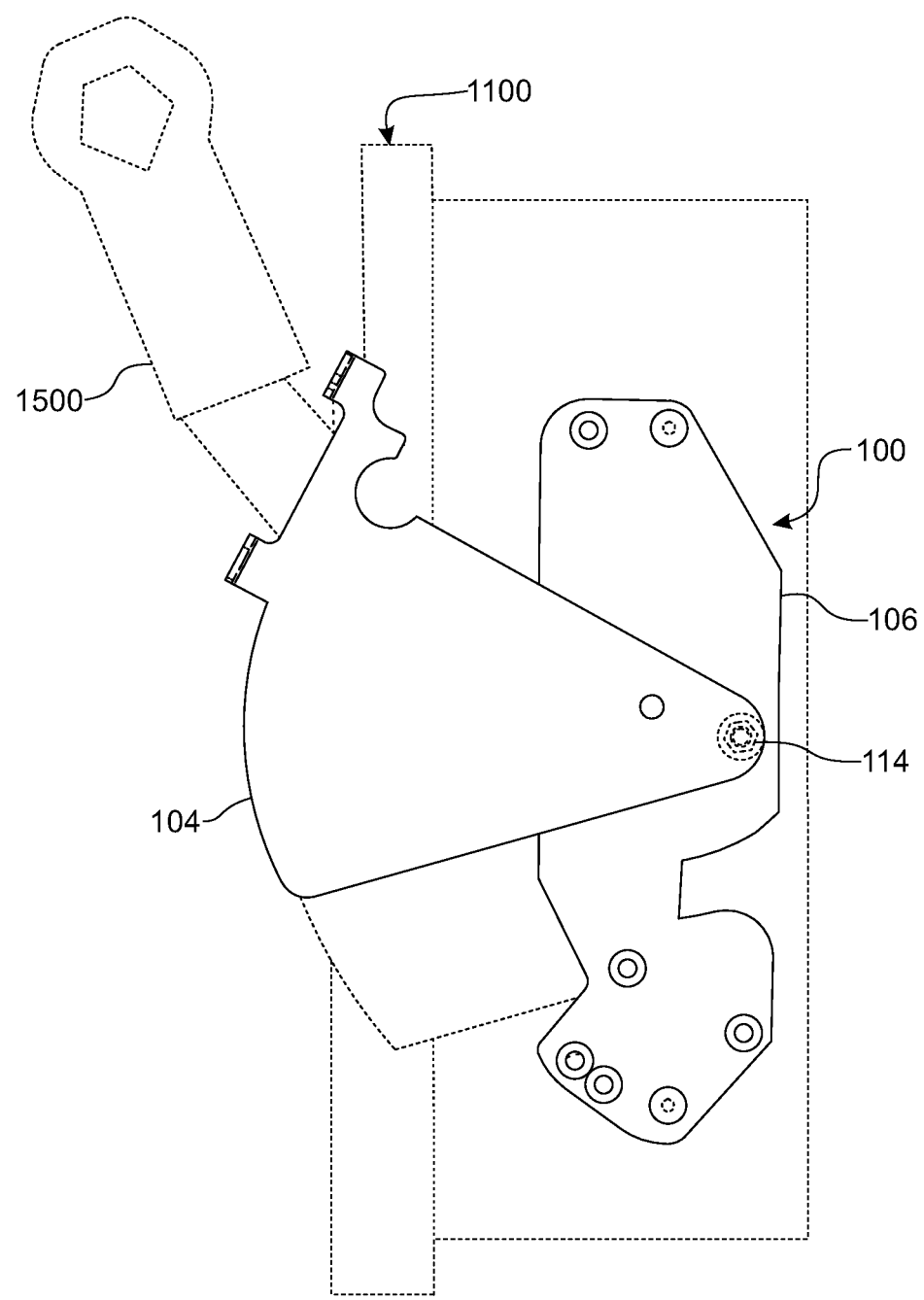
FIG. 16 presents a front view of the lockout prevention system affixed to the safety switch in the "on" position, where the outer second panel blocks a locking aperture of the safety switch, to prevent the safety switch from being locked in the "on" position, and where a pivot point of the outer second panel is changed to a new pivot point with respect to the pivot point of FIG. 15, in accordance with aspects of the present disclosure.

Therefore, in the "on" position of the switch 1100, the first moving panel 102 and/or the second moving panel 104 blocks the locking aperture 1102 of the switch 1100 that normally would be exposed (for locking functionality or use) in the "on" position of the switch 1100. The system blocks and prevents the locking aperture 1102 of the switch 1100 from receiving a lockout-tagout device or padlock 1106 while the handle 1500 is in the "on position". In other words, the system 100 prevents or blocks the locking aperture 1102 of the switch from being locked via a lockout-tagout device or padlock 1106 while the lever or handle 1500 is in an "on" position, or more generally while the lever or handle 1500 is in a "non-off" position. The system 100 is height-adjustable (e.g. with respect to the switch box 1100) by a user in any appropriate way, such as by using spacers 1000. The system 100 may also be shifted by selecting appropriate attachment points of the fixed panel 106 or a pivot position of the first moving panel 102 and/or the second moving panel 104. For example, the pivot position changes between FIGS. 15 and 16 by selecting a different position to install a coupling fastener 114.

As shown in FIG. 1, the second moving panel 104 may include a handle opening 112 and a first coupling mechanism 114. The coupling mechanism 114 couples the moving panels together, and effects a pivot point for rotating or pivoting one or more of the panels (e.g. moving panels) relative to one another or relative to the switch gear box 1100. Therefore, the pivot point of the panels may be selected according to a necessary radius of rotation.

It is to be understood that for purposes of illustration, throughout FIGS. 1-9 the safety switch gear box 1100 is not shown, to illustratively expose rear portions of the disclosed system 100 (e.g. in FIG. 2).

Figure 12:
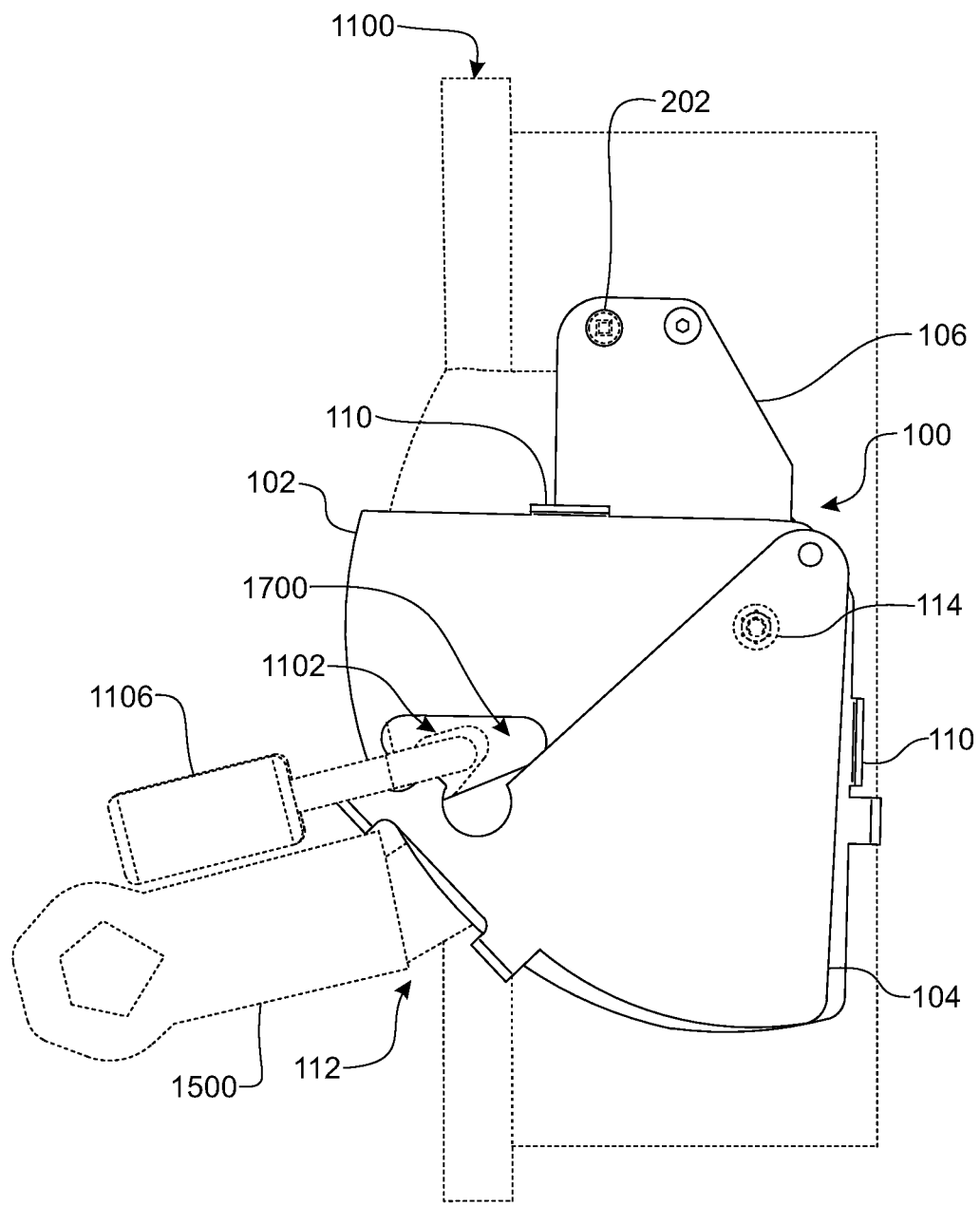
FIG. 12 presents a front view of the lockout prevention system in an "off" position, affixed to a safety switch locked in the "off" position, in accordance with aspects of the present disclosure.
Figure 13:
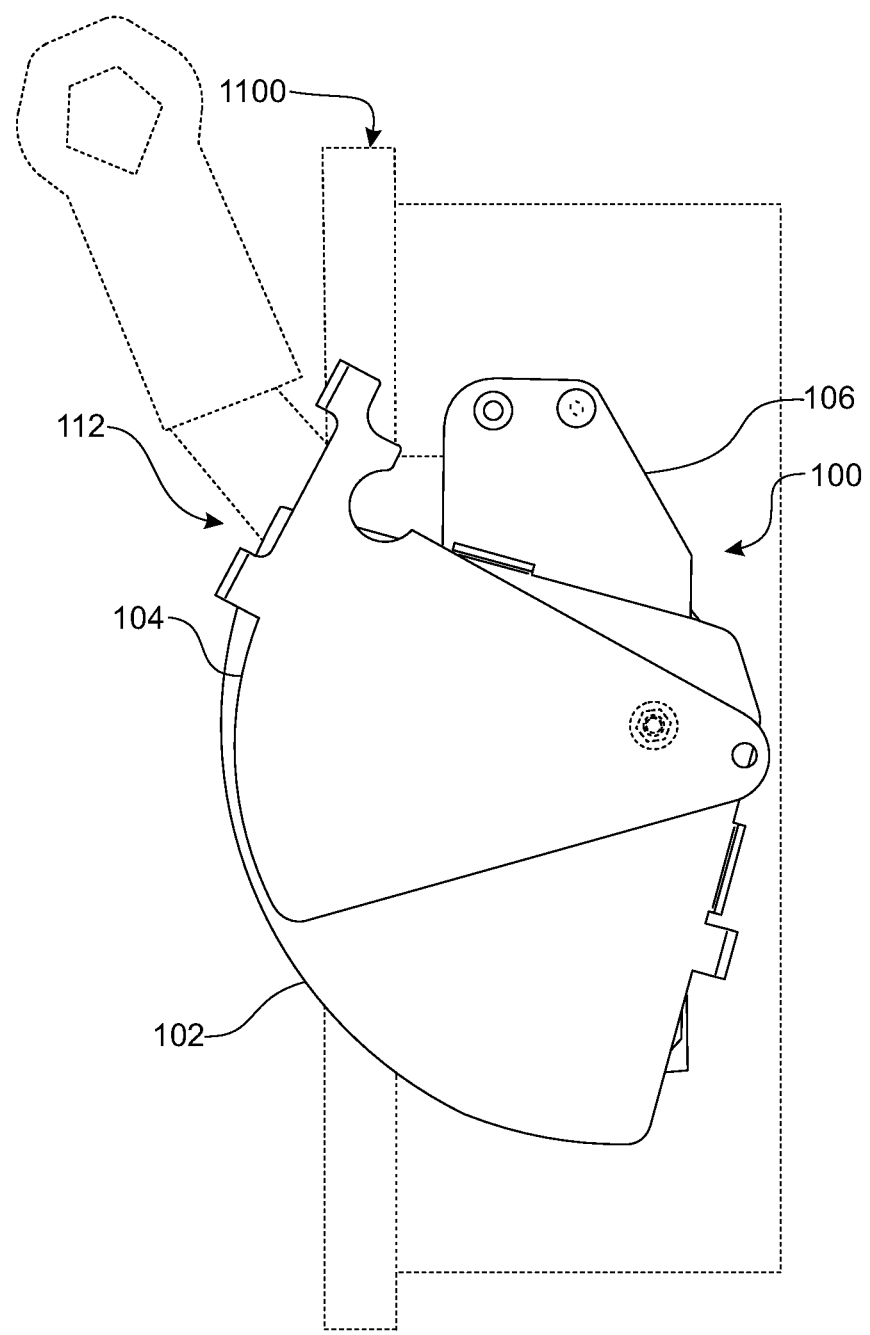
FIG. 13 presents a front view of the lockout prevention system in an "on" position affixed to a safety switch in the "on" position, such that a locking aperture of the safety switch is blocked from being used, blocked by either a second in-between panel or an outer third panel, to prevent the safety switch from being locked in the "on" position, in accordance with aspects of the present disclosure.
Figure 14:
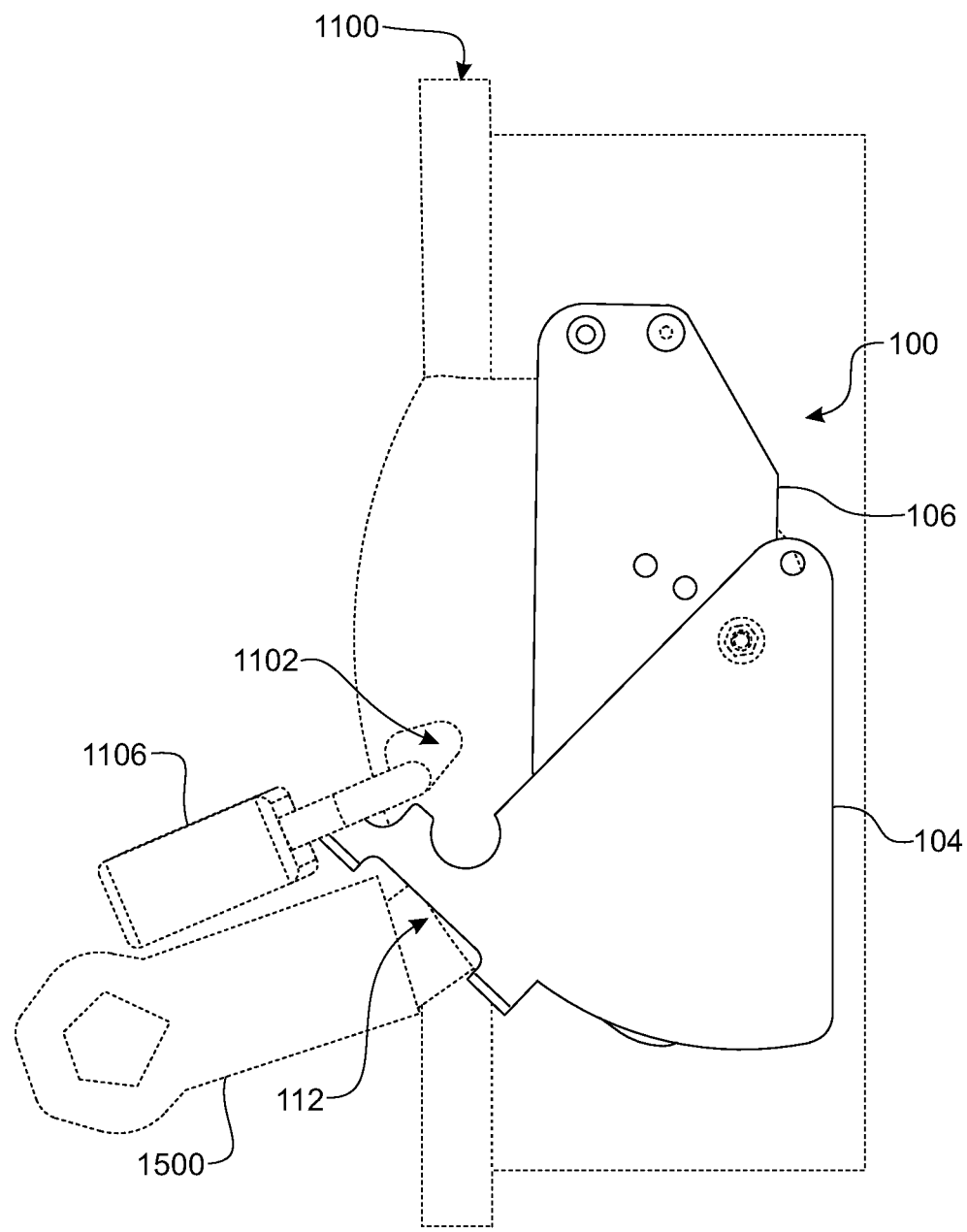
FIG. 14 presents a front view of the lockout prevention system of the present disclosure in an "off" position affixed to a safety switch locked in the "off" position, where first two inner panels of the system are shown in solid line, in accordance with aspects of the present disclosure.

As shown in FIG. 12, the lockout prevention system 100 may be configured to receive a locking device such as a padlock 1106 attachable through one or more of the fixed panel 106, the first moving panel 102, and the second moving panel 104. In one example, the first moving panel 102, the fixed panel 106, and/or the second moving panel 104 are affixed to each other via the coupling mechanism 114 allowing the first moving panel 102 and the second moving panel 104 to move vertically in opposite or similar directions in a hinge-like manner. The first moving panel 102, the fixed panel 106, and/or the second moving panel 104 may further comprise one or more panel apertures 1700 (FIG. 2) configured for receiving the padlock 1106 for locking the switch 1100 in an "off" position upon receiving and locking the padlock 1106 through the panel apertures 1700.

The first moving panel 102, the fixed panel 106, and/or the second moving panel 104 may be composed of iron, steel, or any other suitable element or alloy suitable for industrial environments.

The fastener 202 and the first coupling mechanism 114 may be a screw, peg, bolt, or any suitable fastening mechanism for affixing the panels to each other in a manner that allows the first moving panel 102 and the second moving panel 104 to rotate independently.

Figure 10A:
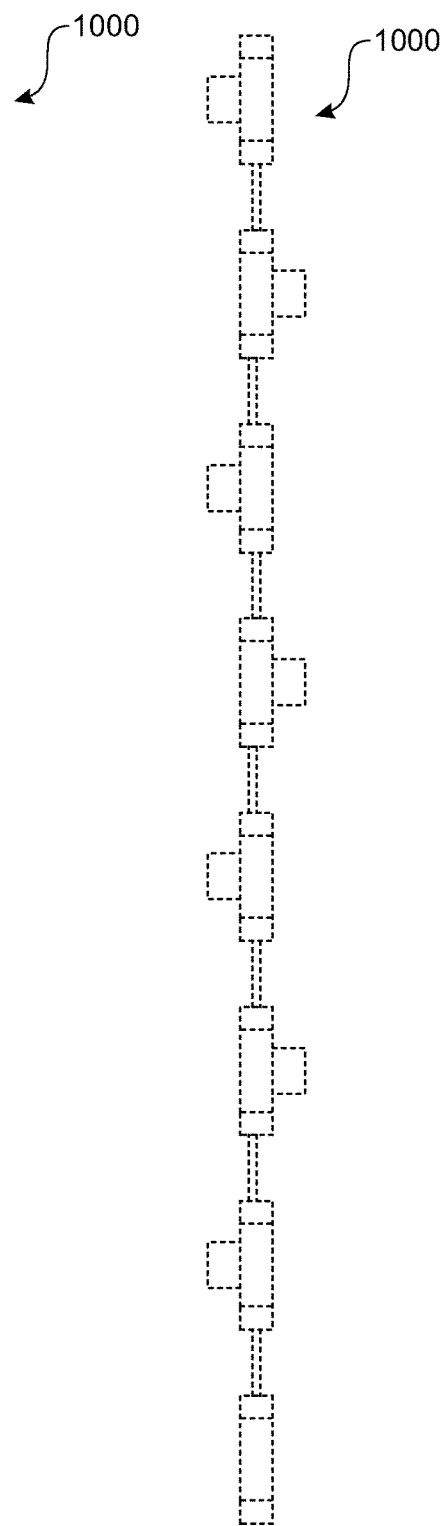
Figure 10B:
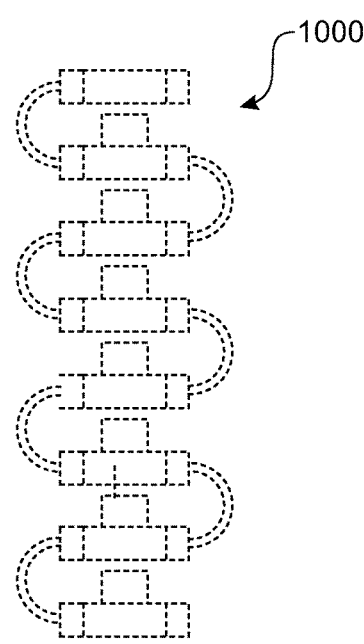
Figure 10C:
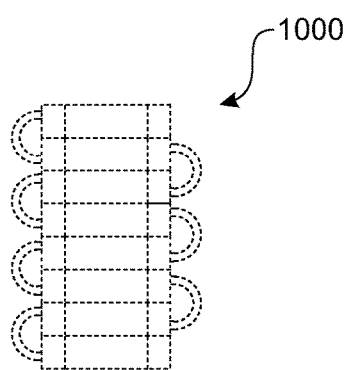

For purposes of illustration, FIGS. 10A-C depict a spacer 1000 configured to be utilized by each of the first moving panel 102, the fixed panel 106, and/or the second moving panel 104, and able to be adjusted to the necessary length via folding or unfolding to the required amount of links to create the correct spacer for the applicable panel. Such a spacer may receive a fastener 202 as shown throughout the figures.

Referring to FIGS. 11-18, the lockout prevention system 100 is affixed to the safety switch gear box 1100. The safety switch gear box 1100 comprises an original equipment manufacturer (OEM) locking aperture 1102 and a handle 1500 configured to control the power supply associated with the safety switch gear box 1100 by rotating the handle 1500 in an upward motion to engage the safety switch gear box 1100 and a downward motion to disengage the safety switch gear box 1100 allowing for movement of the lockout prevention system 100 based upon operation of the handle 1500. In one embodiment, the fixed panel 106 is arranged closest to the safety switch gear box 1100, the second moving panel 104 is configured to rotate directly with respect to operation of the handle 1500, and the first moving panel 102 is configured to rotate after the second moving panel 104 and the handle 1500 reach a certain angle of rotation.

The handle 1500 is configured to penetrate through the handle opening 112 (FIG. 15) allowing fluid movement of the lockout prevention system 100, and more particularly directly the second moving panel 104 (or any panel with the handle opening 112), whenever the user moves the handle 1500. The handle opening 112 may be formed partly or completely via the perpendicular structures 108 described above.

It is to be understood that the disclosed system may be used with switches for shutting down power or turning power on, or for devices that control electric voltage or amperage, or for devices that are configured for running lights, A/C units, equipment, or machines, as non-limiting examples.

In conclusion, the disclosed system prevents the usage of an original equipment manufacturer (OEM) locking aperture of a safety switch box while the safety switch box is in a "non-off" or "on" position.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A lockout prevention system for safety switches configured to be installed on various different brands and styles of industrial safety switch gear boxes, the system comprising:
   one or more panels that are configured to rotate due to the rotation of a switch handle of a switch gear box such that when the switch handle is in a non-off position an OEM locking aperture of the switch gear box is blocked from receiving a locking device in the non-off position, preventing users from accidentally locking a padlock in the locking aperture in the non-off position.

2. The system of claim 1, wherein the system still allows a user to lock the lever arm in the "off position".

3. The system of claim 1, wherein the system is universally mountable to various switch box configurations using two or more bolts.

4. The system of claim 1, wherein the system is height-adjustable.

5. The system of claim 1, wherein the system includes two moving panels and one fixed panel.

6. The system of claim 1, wherein a first panel is disposed closest to a side of a safety switch.

7. The system of claim 6, wherein a second panel is disposed in between the first panel and a third panel.

8. The system of claim 6, wherein the first panel is configured to attach the system to the switch box via one or more fasteners.

9. The system of claim 7, wherein the third panel is configured to rotate directly with respect to operation of the handle.

10. The system of claim 7, wherein the second panel is configured to start rotating after the third panel and the handle reach a certain angle of rotation.

11. The system of claim 7, wherein the second panel includes an aperture that aligns with an aperture of the switch, such that the handle can be locked in an "off" position.

12. The system of claim 7, wherein while the switch is unlocked and once the handle is operated upward, the third panel rotates to a certain degree, then the second panel starts rotating after that certain degree, which subsequently causes the second and/or the third panel to block the locking aperture of the switch, and/or causes the aperture of the second or third panel to rotate away from the locking aperture of the switch.

13. The system of claim 7, wherein in the "on" position the second and/or third panel blocks the locking aperture of the switch that normally would be exposed in the "on" position.

14. The system of claim 1, wherein the system blocks and prevents the locking aperture of the switch from receiving a lockout-tagout device or padlock while the handle is in the "on position".

15. The system of claim 1, wherein, the system prevents or blocks the locking aperture of the switch from being locked via a lockout-tagout device or padlock while the handle is in an "on" position, or while the lever or handle is in a "non-off" position.

16. The system of claim 1, wherein the system prevents the usage of an OEM locking aperture of a safety switch box while the safety switch box is in a "non-off" position.

17. A lockout prevention system for safety switches configured to be installed on various different brands and styles of industrial safety switch gear boxes, the system comprising:
   one or more panels that are configured to rotate due to the rotation of a switch handle of a switch gear box such that when the switch handle is in a non-off position an OEM locking aperture of the switch gear box is blocked from receiving a locking device in the non-off position, preventing users from accidentally locking a padlock in the locking aperture in the non-off position; and
   wherein the system includes two moving panels and one fixed panel.

18. A lockout prevention system for safety switches configured to be installed on various different brands and styles of industrial safety switch gear boxes, the system comprising:
   one or more panels that are configured to rotate due to the rotation of a switch handle of a switch gear box such that when the switch handle is in a non-off position an OEM locking aperture of the switch gear box is blocked from receiving a locking device in the non-off position, preventing users from accidentally locking a padlock in the locking aperture in the non-off position;
   wherein a first panel is disposed closest to a side of a safety switch;
   wherein a second panel is disposed in between the first panel and a third panel;
   wherein the first panel is configured to attach the system to the switch box via one or more fasteners; and
   wherein the third panel is configured to rotate directly with respect to operation of the handle.

19. The system of claim 18, wherein the second panel is configured to start rotating after the third panel and the handle reach a certain angle of rotation.

20. The system of claim 18, wherein the second panel includes an aperture that aligns with an aperture of the switch, such that the handle can be locked in an "off" position.

* * * * *